United States Patent
Rai et al.

(10) Patent No.: US 8,310,700 B2
(45) Date of Patent: Nov. 13, 2012

(54) SYSTEM AND METHOD OF EVALUATING PRINT SHOP CONSOLIDATION OPTIONS IN AN ENTERPRISE

(75) Inventors: Sudhendu Rai, Fairport, NY (US); Jie Lin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 238 days.

(21) Appl. No.: 12/201,055

(22) Filed: Aug. 29, 2008

(65) Prior Publication Data

US 2009/0033996 A1   Feb. 5, 2009

Related U.S. Application Data

(63) Continuation of application No. 11/450,997, filed on Jun. 12, 2006, now Pat. No. 7,430,056, which is a continuation of application No. 11/185,202, filed on Jul. 19, 2005, now Pat. No. 7,125,179.

(51) Int. Cl.
*G06F 3/12* (2006.01)
*G06F 15/16* (2006.01)
*G06K 15/00* (2006.01)
*G01D 9/42* (2006.01)

(52) U.S. Cl. ...... 358/1.15; 358/1.1; 358/1.13; 358/1.14; 358/1.16; 709/247; 346/107.3

(58) Field of Classification Search .......... None
See application file for complete search history.

(56) References Cited

U.S. PATENT DOCUMENTS

| | | | |
|---|---|---|---|
| 4,896,269 A | 1/1990 | Tong | |
| 6,348,971 B2 * | 2/2002 | Owa et al. | 358/1.15 |
| 6,633,821 B2 | 10/2003 | Jackson et al. | |
| 6,805,502 B2 | 10/2004 | Rai et al. | |
| 7,079,266 B1 | 7/2006 | Rai et al. | |
| 7,239,408 B1 * | 7/2007 | Whitmarsh et al. | 358/1.15 |
| 2002/0071134 A1 | 6/2002 | Jackson et al. | |
| 2002/0129081 A1 | 9/2002 | Rai et al. | |
| 2003/0041765 A1 * | 3/2003 | Hill | 101/484 |
| 2003/0149747 A1 | 8/2003 | Rai et al. | |
| 2004/0001219 A1 | 1/2004 | Wen et al. | |
| 2005/0151993 A1 * | 7/2005 | Gartstein et al. | 358/1.15 |

* cited by examiner

*Primary Examiner* — Twyler Haskins
*Assistant Examiner* — Marcus T Riley
(74) *Attorney, Agent, or Firm* — Luis M. Ortiz; Kermit D. Lopez; Melissa Asfahani

(57) ABSTRACT

A print shop consolidation system including a print shop consolidation management system with an application is provided. The application is used to (1) evaluate, with a set of information, an operational capacity of a first print shop to process both a first group of print jobs and a second group of print jobs, (2) evaluate, with the set of information, an operational capacity of the second print shop to process both the first and second groups of print jobs, and (3) use the evaluations of (1) and (2) to consolidate processing of the first and second groups of print jobs at one of first and second print shops.

18 Claims, 9 Drawing Sheets

Job Data

| Jobid | Arrival | Due | Nbooks | BW/Printing | ColorPrinting | Scanning | Packaging |
|---|---|---|---|---|---|---|---|
| 272028 | 9/9/2004 7:59:00 AM | 9/10/2004 4:00:00 PM | 4000 | 4000 | 0 | 0 | 0 |
| 272031 | 9/9/2004 9:00:00 AM | 9/10/2004 4:00:00 PM | 360 | 0 | 360 | 0 | 0 |
| 271542 | 9/9/2004 9:00:00 AM | 9/10/2004 4:00:00 PM | 1190 | 1190 | 0 | 330 | 0 |
| 272033 | 9/9/2004 10:00:00 AM | 9/10/2004 4:00:00 PM | 500 | 0 | 500 | 0 | 0 |
| 255272 | 9/9/2004 10:00:00 AM | 9/10/2004 4:00:00 PM | 3055 | 3055 | 0 | 300 | 0 |
| 272027 | 9/10/2004 7:00:00 AM | 9/10/2004 4:00:00 PM | 1172 | 1172 | 0 | 0 | 0 |
| 272035 | 9/13/2004 9:00:00 AM | 9/15/2004 4:00:00 PM | 16017 | 16017 | 0 | 0 | 0 |
| 271565 | 9/13/2004 10:59:00 AM | 9/13/2004 4:00:00 PM | 5520 | 5520 | 0 | 0 | 0 |
| 271562 | 9/13/2004 10:59:00 AM | 9/13/2004 4:00:00 PM | 6640 | 6640 | 0 | 40 | 0 |
| 271563 | 9/13/2004 10:59:00 AM | 9/13/2004 4:00:00 PM | 14950 | 14950 | 0 | 0 | 0 |
| 271560 | 9/13/2004 11:29:00 AM | 9/14/2004 4:00:00 PM | 10250 | 10250 | 0 | 0 | 0 |
| 271561 | 9/13/2004 11:29:00 AM | 9/13/2004 1:59:00 PM | 180 | 180 | 0 | 180 | 0 |
| 271564 | 9/14/2004 10:00:00 AM | 9/14/2004 4:00:00 PM | 4400 | 4400 | 0 | 0 | 0 |
| 271567 | 9/14/2004 10:00:00 AM | 9/14/2004 4:00:00 PM | 11700 | 11700 | 0 | 0 | 0 |
| 271566 | 9/14/2004 10:00:00 AM | 9/14/2004 4:00:00 PM | 14400 | 14400 | 0 | 0 | 0 |
| 278192 | 9/14/2004 1:00:00 PM | 9/15/2004 4:00:00 PM | 5640 | 5640 | 0 | 0 | 0 |
| 271568 | 9/15/2004 10:59:00 AM | 9/15/2004 4:00:00 PM | 2310 | 2310 | 0 | 0 | 0 |

*FIG. 3*

| Date | BWPrinting |
|---|---|
| 9/9/2004 | 513 |
| 9/10/2004 | 660 |
| 9/13/2004 | 8625 |
| 9/14/2004 | 6194 |
| 9/15/2004 | 1573 |

FIG. 4

Job Data

| Jobid | Arrival | Due | Nbooks | BW/Printing | ColorPrinting | Scanning | Packaging |
|---|---|---|---|---|---|---|---|
| 272028 | 9/9/2004 7:59:00 AM | 9/10/2004 3:00:00 PM | 4000 | 4000 | 0 | 0 | 0 |
| 272031 | 9/9/2004 9:00:00 AM | 9/10/2004 3:00:00 PM | 360 | 0 | 360 | 0 | 0 |
| 271542 | 9/9/2004 9:00:00 AM | 9/10/2004 3:00:00 PM | 1190 | 1190 | 0 | 330 | 0 |
| 272033 | 9/9/2004 10:00:00 AM | 9/10/2004 3:00:00 PM | 500 | 0 | 500 | 0 | 0 |
| 255272 | 9/9/2004 10:00:00 AM | 9/10/2004 3:00:00 PM | 3055 | 3055 | 0 | 300 | 0 |
| 272027 | 9/10/2004 7:00:00 AM | 9/10/2004 4:00:00 PM | 1172 | 1172 | 0 | 0 | 0 |
| 272035 | 9/13/2004 9:00:00 AM | 9/15/2004 3:00:00 PM | 16017 | 16017 | 0 | 0 | 0 |
| 271565 | 9/13/2004 10:59:00 AM | 9/13/2004 3:00:00 PM | 5520 | 5520 | 0 | 0 | 0 |
| 271562 | 9/13/2004 10:59:00 AM | 9/13/2004 3:00:00 PM | 6640 | 6640 | 0 | 40 | 0 |
| 271563 | 9/13/2004 10:59:00 AM | 9/13/2004 3:00:00 PM | 14950 | 14950 | 0 | 0 | 0 |
| 271560 | 9/13/2004 11:29:00 AM | 9/13/2004 3:00:00 PM | 10250 | 10250 | 0 | 0 | 0 |
| 271561 | 9/13/2004 11:29:00 AM | 9/13/2004 12:59:00 PM | 180 | 0 | 180 | 0 | 0 |
| 271564 | 9/14/2004 10:00:00 AM | 9/14/2004 3:00:00 PM | 4400 | 4400 | 0 | 0 | 0 |
| 271567 | 9/14/2004 10:00:00 AM | 9/14/2004 3:00:00 PM | 11700 | 11700 | 0 | 0 | 0 |
| 271566 | 9/14/2004 10:00:00 AM | 9/14/2004 3:00:00 PM | 14400 | 14400 | 0 | 0 | 0 |
| 278192 | 9/14/2004 1:00:00 PM | 9/15/2004 3:00:00 PM | 5640 | 5640 | 0 | 0 | 0 |
| 271568 | 9/15/2004 10:59:00 AM | 9/15/2004 3:00:00 PM | 2310 | 2310 | 0 | 0 | 0 |

*FIG. 6*

| Date | BWPrinting |
|---|---|
| 9/9/2004 | 548 |
| 9/10/2004 | 715 |
| 9/13/2004 | 10862 |
| 9/14/2004 | 7280 |
| 9/15/2004 | 1758 |

FIG. 7

|    | S1 | S2 | S3 |
|----|------|-------|-------|
| S1 | 8625 | 10682 | 14858 |
| S2 | 10386 | 9078 | 9382 |
| S3 | 6633 | 3379 | 3160 |

FIG. 8

|    | S1 | S2 | S3 |
|----|------|-------|-------|
| S1 | 8625 | | |
| S2 | | 9078 | |
| S3 | | 3379 | |
| Total | 8625 | 12457 | 21082 |

FIG. 9

|  | S1 | S2 | S3 |  |
|---|---|---|---|---|
| S1 |  | 10682 |  |  |
| S2 |  | 9078 |  |  |
| S3 |  |  | 3160 |  |
| Total | 0 | 19940 | 3160 | 23100 |

FIG. 10

|  | S1 | S2 | S3 |  |
|---|---|---|---|---|
| S1 | 8625 |  |  |  |
| S1 |  |  | 9382 |  |
| S1 |  |  | 3160 |  |
| Total | 8625 | 0 | 12542 | 21167 |

FIG. 11

| CONSOLIDATION OPTION | TYPE | TAKT-RATE REQUIREMENT |
|---|---|---|
| S1 & S2 | TWO LOCATIONS | 21082 |
| S1 & S3 | TWO LOCATIONS | 21167 |
| S2 & S3 | TWO LOCATIONS | 23100 |
| S2 | SINGLE LOCATION | 23319 |
| S1 | SINGLE LOCATION | 25644 |
| S3 | SINGLE LOCATION | 27400 |

FIG. 12

SYSTEM AND METHOD OF EVALUATING PRINT SHOP CONSOLIDATION OPTIONS IN AN ENTERPRISE

RELATED APPLICATIONS

This application is a continuation of now allowed U.S. patent application Ser. No. 11/450,997, entitled "A SYSTEM AND METHOD OF EVALUATING PRINT SHOP CONSOLIDATION OPTIONS IN AN ENTERPRISE" filed by Rai et al. on Jun. 12, 2006 now U.S. Pat. No. 7,430,056 which is a continuation of U.S. patent application Ser. No. 11/185,202 filed by Rai et al. on Jul. 19, 2005 (now U.S. Pat. No. 7,125,179).

TECHNICAL FIELD

Embodiments relate to production printing and, more particularly, to systems and methods of evaluating print shop consolidation options.

BACKGROUND AND SUMMARY

An enterprise of geographically distributed print shops is a frequent occurrence in the production printing industry. Typically, resources in print shops are organized so that when a print job arrives from a customer at a particular print shop, the print job can be processed by performing one or more production functions. Maintaining print shops at multiple locations often necessitates providing the same labor and facilities at each individual site which, in turn, can lead to inefficient distribution of equipment and labor among the print shops.

Consolidating multiple print shop sites into fewer sites can save labor and facility costs. However, known methods of print shop consolidation are based on random or improvised approaches which cannot reliably and accurately provide the most appropriate print shop consolidation options and which, therefore, result in inefficient consolidation of prints shops.

There is a need to provide a methodology of evaluating options for consolidating multiple print shop sites into fewer consolidated sites The embodiments disclosed herein therefore address the shortcomings of known techniques of evaluating print shop consolidation options by providing a system and method enabling consolidating processing of print job groups at one or more print shops.

In accordance with one aspect of the disclosed embodiments, there is provided a print shop consolidation system for consolidating processing of a first group of print jobs and a second group of prints jobs at one of a first print shop and a second print shop. As contemplated, the first group of print jobs would, without consolidation, be printed at the first print shop, and the second group of print jobs would, without consolidation, be printed at the second print shop. The print shop consolidation system includes: (A) memory for storing a set of information relating to both a print job processing capability of the first print shop and a print job processing capability of the second print shop; (B) a print shop consolidation management system, the print shop consolidation management system including an application for (1) evaluating, with the set of information, an operational capacity of the first print shop to process both the first and second groups of print jobs, (2) evaluating, with the set of information, an operational capacity of the second print shop to process both the first and second groups of print jobs, and (3) consolidating processing of the first and second groups of print jobs at one of first and second print shops, with said evaluations of (B)(1) and (B)(2) so that either (a) processing of the first and second print jobs occurs solely at the first print shop, or (b) processing of the first and second print job occurs solely at the second print shop.

In accordance with another aspect of the disclosed embodiments, there is provided a print shop consolidation system for consolidating processing of a first group of print jobs, a second group of prints jobs and a third group of print jobs at one or two of a first print shop, a second print shop and a third print shop, The print shop consolidation system includes: (A) a memory for storing a set of information relating to respective print job processing capabilities of the first print shop, the second print shop and the third print shop; and; and (B) a print shop consolidation management system, said print shop consolidation management system including an application for, (1) evaluating, with the set of information, an operational capacity of the first print shop to process first, second, and third groups of print jobs, (2) evaluating, with the set of information, an operational capacity of the second print shop to process the first, second, and third groups of print jobs, (3) evaluating, with the set of information, an operational capacity of the third print shop to process the first, second, and third groups of print jobs, and (4) with said evaluations of (B)(1), (B)(2), and (B)(3), (a) consolidating processing of two of the first, second, and third print jobs at a first one of the first, second and third print shops, and (b) processing a third of the first, second, and third print jobs at a second one of the first, second, and third print shops.

In accordance with yet another aspect of the disclosed embodiments there is provided a method for consolidating processing of a first group of print jobs and a second group of prints jobs at one of a first print shop and a second print shop. As contemplated, the first group of print jobs would, without consolidation, be printed at the first print shop, and the second group of print jobs would, without consolidation, be printed at the second print shop. The method includes: (A) storing, in memory, a set of information relating to both a print job processing capability of the first print shop and a print job processing capability of the second print shop; (B) evaluating, with the set of information, an operational capacity of the first print shop to process both the first and second groups of print jobs; (C) evaluating, with the set of information, an operational capacity of the second print shop to process both the first and second groups of print jobs; and (D) consolidating processing of the first and second groups of print jobs at one of first and second print shops, with said evaluations of (B) and (C) so that either (1) processing of the first and second print jobs occurs solely at the first print shop, or (2) processing of the first and second print job occurs solely at the second print shop.

In accordance with another aspect of the disclosed embodiments, there is provided a method for consolidating processing of a first group of print jobs, a second group of prints jobs and a third group of print jobs at one or two of a first print shop, a second print shop and a third print shop. The method includes: (A) storing a set of information relating to respective print job processing capabilities of the first print shop, the second print shop and the third print shop; (B) evaluating, with the set of information, an operational capacity of the first print shop to process first, second, and third groups of print jobs; (C) evaluating, with the set of information, an operational capacity of the second print shop to process first, second, and third groups of print jobs; (D) evaluating, with the set of information, an operational capacity of the third print shop to process first, second, and third groups of print jobs; and (E) with said evaluations of (B), (C), and (D), performing one of the following: (1) consolidating processing of the first, second, and third groups of print jobs at just one of the first, second, and third print shops, or (2) consolidating processing of two of the first, second, and third print jobs at a first one of the first, second and third print shops, and a third of the first, second, and third print jobs at a second one of the first, second, and third print shops.

BRIEF DESCRIPTION OF THE DRAWINGS

The accompanying figures, in which like reference numerals refer to identical or functionally similar elements throughout the separate views and which are incorporated in and form a part of the specification, further illustrate the embodiment, together with the background, brief summary, and detailed description, serve to explain the principles of the illustrative embodiment.

FIG. 3 illustrates a table including job data associated with a print shop for use in evaluating print shop consolidation options in accordance with an embodiment;

FIG. 4 illustrates a table including maximum daily initial takt-rate for black and white printing calculated based on the job data of FIG. 3;

FIG. 6 illustrates a table of job data of FIG. 2 but with the due dates offset to take into account transportation delay in accordance with the embodiment;

FIG. 7 illustrates a table of modified takt-rate for black and white printing calculated using the job data of FIG. 6;

FIG. 8 illustrates a table of black and white printing takt-rate for processing jobs at various print shop locations shown in FIG. 1 that require transportation from the shop of origination to the shop of production;

FIG. 9 illustrates a table of required takt-rate results for consolidating into shops S1 and S2 of FIG. 1 based on takt-rates taken from FIG. 8;

FIG. 10 illustrates a table of required takt-rate results for consolidating into shops S2 and S3 of FIG. 1 based on takt-rates taken from FIG. 8;

FIG. 11 illustrates a table of required takt-rate results for consolidating into shops S1 and S3 of FIG. 1 based on takt-rates taken from FIG. 8;

FIG. 12 illustrates a matrix of required takt-rate capacities for various possible options of consolidating the three print shops of FIG. 1.

DETAILED DESCRIPTION

The illustrative embodiment provides an approach to evaluating options of consolidating print shops in an enterprise so that the most appropriate print shop consolidation options can be selected to provide equivalent or improved performance.

For the purposes of discussion hereinafter, a "print shop" refers to a grouping of printing resources. The print shop may be a freestanding entity such as a commercial printer or may be part of a corporation or other entity. A "print job" refers to a logical unit of work that is to be completed for a customer. For example, a request to make 10 copies of a book is a print job. Similarly, a request to make 100 copies of a single document is a print job. A production function can be any operation or processing step involved in the processing of the print job. For example, a production function can be black & white printing, color printing, scanning, or packaging.

Figure 1:
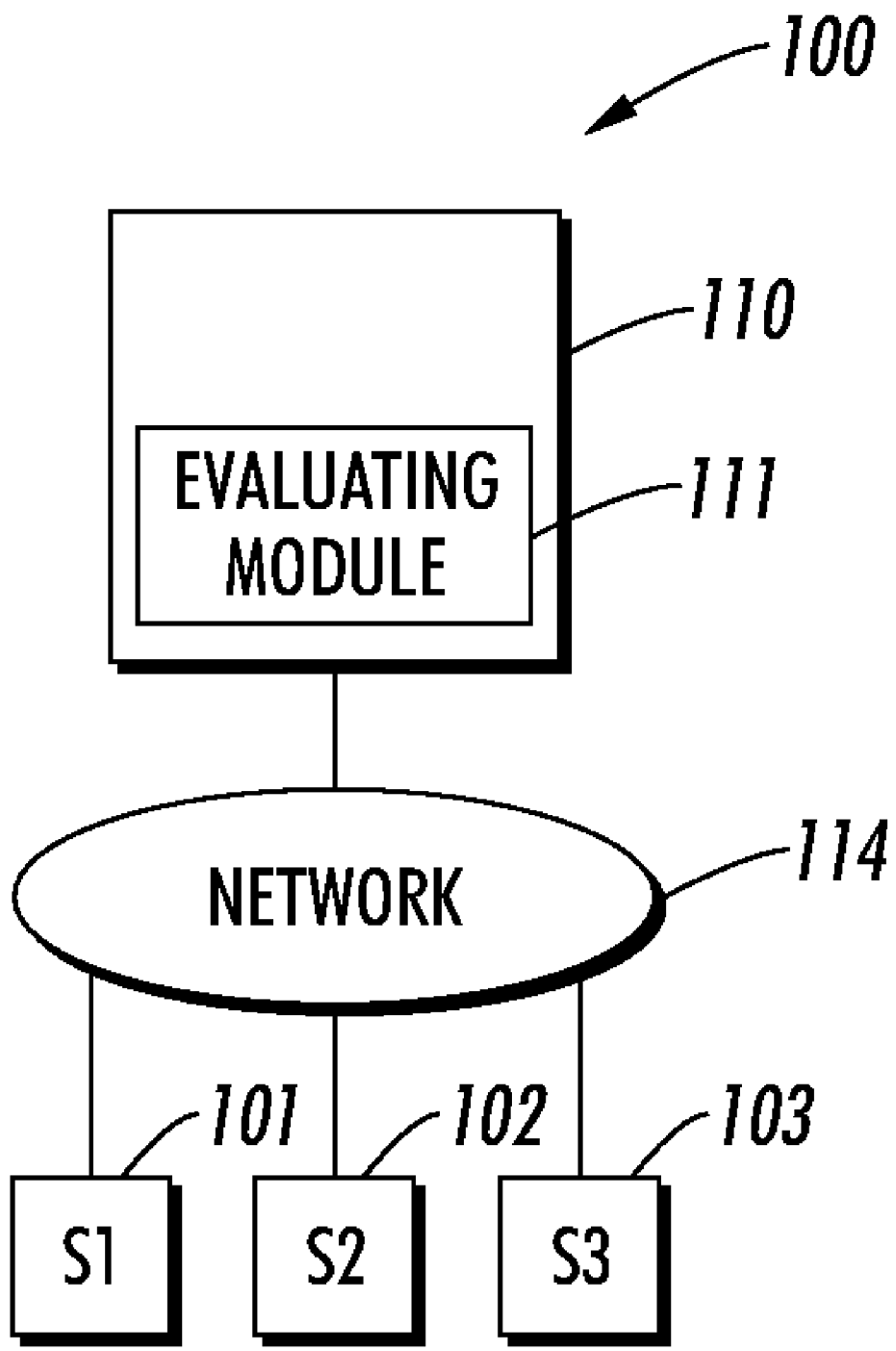
FIG. 1 illustrates a management system implemented on a computer for evaluating print shop consolidation options in an enterprise together with three print shops prior to consolidation in accordance with an embodiment.

Referring to FIG. 1 of the accompanying drawings, which illustrates a management system 110 for evaluating options of consolidating distributed print shops 101, 102, 103 in an enterprise, a suitable environment 100 for practicing the illustrative embodiment can be a management system 110 implemented on an electronic automated system. For example, the management system can be implemented on a stand-alone computer system, such as a workstation, or on a networked computer.

Those skilled in the art would understand that the illustration of FIG. 1 is merely depicting one example of the embodiments and that the embodiments are not limited thereto. As will be discussed in more detail below, the enterprise can have more than or less than three print shops. The management system 110 of FIG. 1 is operatively coupled, for example via a data network 114, to equipment, such as computers, located at the print shops, 101, 102, 103. However, a skilled person in the art would know that the management system need not be so operatively coupled for the purpose of obtaining data from the print shops. The management system may include a module 111 which is responsible for evaluating the consolidation options. The module 111 may be in the form of software or hardware. The module can be run locally on the management system or run from a remote location via a network coupled to the management system. A person skilled in the art would know that there are multiple modes of implementing such a module.

Figure 2:
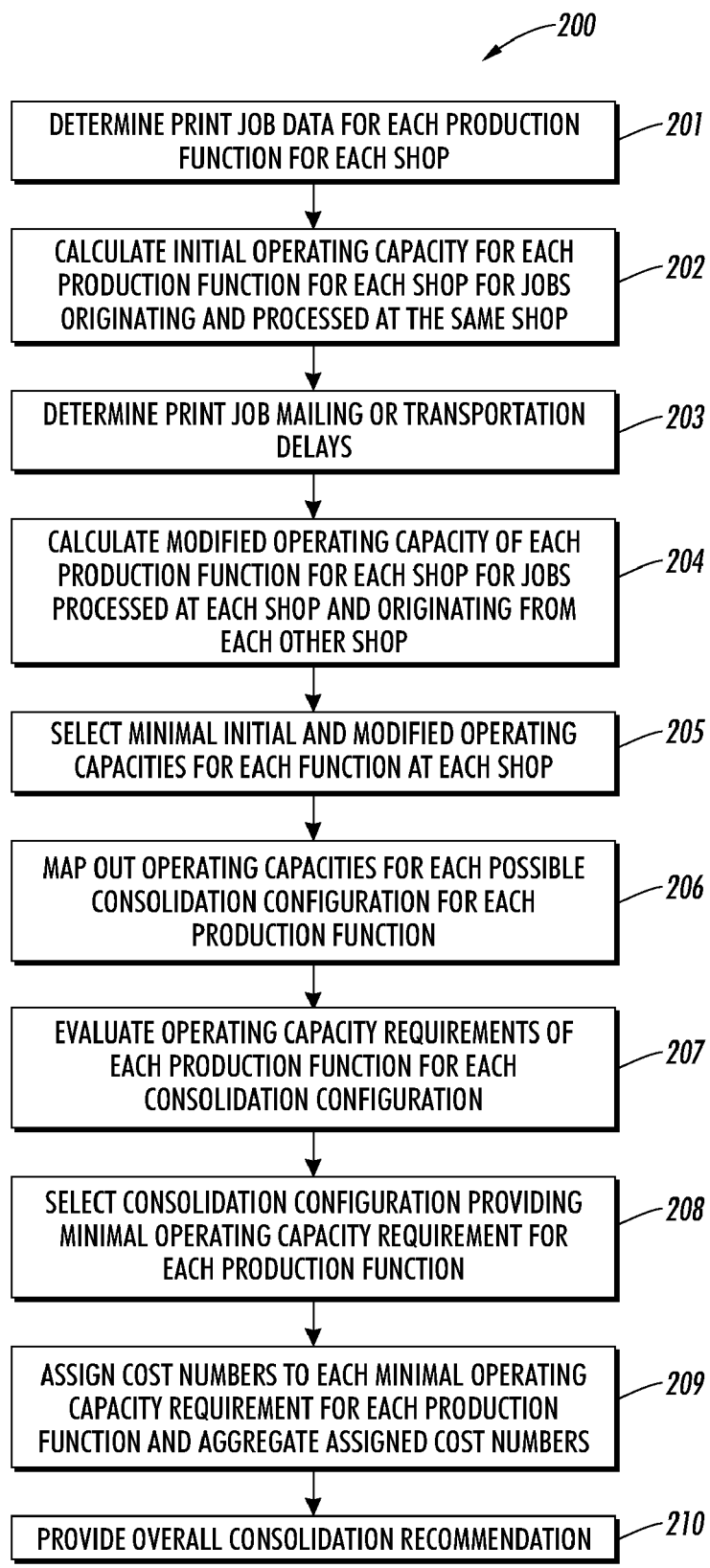
FIG. 2 illustrates a flow-diagram outlining steps which are performed in evaluating print shop consolidation options in an enterprise in accordance with an embodiment.
Figure 5:
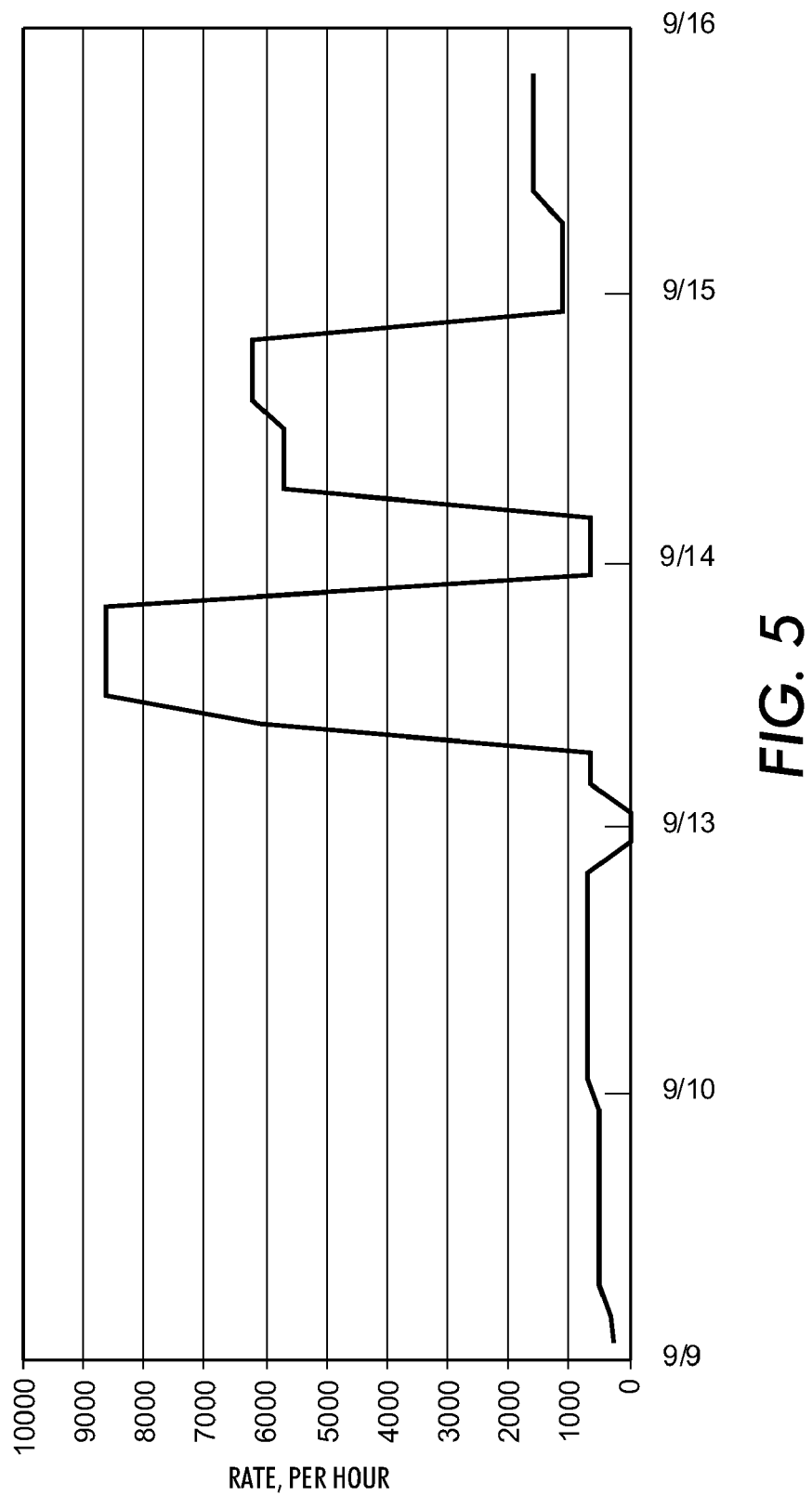
FIG. 5 illustrates a graph of takt-rate as a function of work days for the black and white printing for job data of FIG. 3.

FIG. 2 provides an overview of the steps which are performed in evaluating print shop consolidation options of the enterprise in the illustrative embodiment. Initially, the distributed print shops are identified and job data for each production function for each shop is determined (step 201 of FIG. 2). The job data represents a list of jobs and their characteristics, that is, the job arrival and due dates for each job, the production functions for processing each job and the number of impressions required to be produced by each production function for processing each job. Examples of job data for print shop 101 are shown in the form of a table in FIG. 3. The job data is determined by receiving the data at the management system 110. Alternatively, the job data can be estimated by the management system itself. Thereafter, the operating capacity of each production function in a given work period at each shop is estimated by the management system based on the scenario that all jobs that originate at each shop are processed at the same shop (step 202 in FIG. 2).

In this embodiment, the operating capacity is represented by the takt-rate TRi for each working day for each production function. In order to appreciate how the takt-rate is calculated, is useful to consider the following parameters. If there are n jobs $J_i$ and each job has an arrival time of $t\_arr_i$ and a due date of $t\_due_i$. Each job also has a production quantity $q_i$ associated with each processing step or production function where the processing step belongs to a set of workstations W with element we with a processing rate of $r_i$. (A value of 0 for $q_i$ for some i implies that there is no processing associated with the workstation). The takt-rate $TR_i(t)$ (units required to be produced per unit time) on each workstation at any time t is therefore:

$$TR_i(t) = \sum_{i=1}^{n} \frac{q_i(t)}{t\_due_i - t\_arr_i} \quad (1)$$

where $q_i(t) = q_i$ if $t\_arr_i < t < t\_due_i$ and $q_i(t) = 0$ otherwise

As an example, the total takt-rate for each working day for a particular production function, in this case, black and white printing, estimated by the management system 110 using the job data of FIG. 3, is shown in FIG. 4. Similar calculations of takt-rates can be preformed for the other production functions, nbooks, color printing, scanning and packaging referred to in the job data of FIG. 3.

If consolidation of print shops from multiple locations to fewer locations is to take place, it is necessary to take into account the scenario in which jobs may originate at one particular print shop 101, 102, 103 and then may be sent to a different print shop 101, 102, 103 for processing. Sending the jobs to another shop delays production. Consequently, the operating capacity associated with each production function at each shop increases. The initial calculated operating capacity therefore has to be modified to take into account the scenarios in which the print jobs originate at each print shop and can be transported to each other print shop for subsequent processing of the print job at each other shop.

To this end, the mailing or transportation times for sending jobs originating from each shop to each other shop for processing are received or estimated by the management system 110 (Step 203 of FIG. 2). The system subtracts these delay times from the corresponding original due times to take into account the sending delays. The modified operating capacity for each production function at each shop is estimated by the system using the new due times (step 204 of FIG. 2). For example, if jobs listed in FIG. 3 originating at first shop 101 are to be processed at a second shop 102 and the transportation time is 1 hr, then the total modified takt-rates for each production function at shop 102 for jobs originating from shop 101 for each working day estimated by the system will be as shown in the table of FIG. 6.

The maximum initial and modified takt-rates for each production function during a predetermined time interval are then calculated by the system (step 205 of FIG. 2). For example, from FIG. 4, the maximum black and white printing initial takt-rate requirement during a working week is 8625 impressions/hr and from FIG. 7, the maximum black and white printing modified takt-rate requirement during a working week is 10862 impressions/hr. If necessary, some other predetermined time interval can be selected or, alternatively, the takt-rates can be chosen based on criteria other than a maximum over a given period.

Using these analyses, configurations of consolidating a number of print shops into a few numbers of shops can be determined and the estimated maximum takt-rate for each production function for each configuration can be mapped out for each consolidation configuration (step 206 of FIG. 2). Accordingly, a takt-rate matrix $T_{ij}$ can be computed by the system where the $ij^{th}$ element denotes the maximum takt-rate for the scenario where all the jobs that have originated at shop i are processed at shop j. To illustrate this step, reference will now be made to the example of FIG. 8 which illustrates a matrix of maximum black and white printing takt-rates for jobs originating and processed at the three shops 101 (S1), 102 (S2), 103 (S3) of FIG. 1 and for jobs requiring transportation from each print shop 101 (S1), 102 (S2), 103 (S3) for processing at each other print shop 101 (S1), 102 (S2), 103 (S3). The row of indications S1, S2 & S3 at the top of the matrix represent shops of job production whereas the column of indications S1, S2 & S3 at the side of the matrix represents shops of job origination.

Thereafter, the system 110 determines the minimum operating capacity requirement for each consolidation configuration to evaluate the options of consolidating a number of print shops 101, 102, 103 into fewer consolidated shops (step 207 of FIG. 2). To illustrate this step, reference is once again made to the example of the matrix of FIG. 8. Suppose it is necessary to determine the consolidation options for the case in which the 3 shops 101 (S1), 102 (S2), 103 (S3) are to be consolidated into 1 location. The maximum production takt-rate for the situation will be evaluated when the shops are collocated at each of one of the three locations. Therefore, if all shops are consolidated into 1 location which happens to be shop 101 (S1); then the total takt-rate for black and white printing is (8625+10386+6633)=25644 impressions/h. If the shops are consolidated at 102 (S2) the total takt-rate is (10862+9078+3379)=23319 impressions/h. Similarly, the result of consolidation at 102 (S2) is 27400 impressions/h. Therefore the best option is to consolidate at location 102 (S2) since it gives the minimum takt-rate for the enterprise.

In order to evaluate the consolidation options when the shop consolidation occurs at 2 shops, options of consolidation at 101 (S1), 102 (S2) or 102 (S2), 103 (S3) or 101 (S1), 103 (S3) are evaluated by the system. For the situation of consolidating into two shops 101 (S1) and 102 (S2), it is assumed that all jobs should be performed at the shop with lowest takt-rate. Therefore according to FIG. 8, all jobs at 101 (S1) will be performed at 101 (S1) because the lowest takt-rate is 8625 and occurs at 101 (S1). Similarly, since jobs that originate from 102 (S2) can be processed at 102 (S2) at a lower required takt-rate than if they are processed at 101 (S1), the jobs originating from 102 (S2) are assigned to 102 (S2) for processing. Similarly, the jobs originating at 103 (S3) are better allocated to 102 (S2) because takt-rate required to process the jobs is lower if they are process at 102 (S2) than if they are processed at 101 (S1). The result of this allocation of job capacity to shops 101 (S1) and 102 (S2) leads to a total capacity allocation of 21082 impressions/h for the Black and White printing production function as shown in FIG. 9.

Matrices and total capacity allocations for the other two possible consolidation options of consolidating the three shops into consolidated shops 102 (S2) and 103 (S3) and into consolidated shops 101 (S1) and 103 (S3) are shown in FIG. 10 and FIG. 11, respectively.

Referring to FIG. 12, which illustrates a chart summarizing the takt-rate requirement for the various consolidation options, clearly, in this example, the takt-rate (and hence required capacity) for black and white printing is minimized by choosing the option of consolidation at print shop 101 (S1) and 102 (S2).

A similar analysis can be performed for other production functions such as Color Printing. The capacity requirement can be mapped to a cost number and then various cost numbers for each function including costs of facility, labor and other related items can be aggregated into a single cost number for each option (Step 209 of FIG. 2). This can be sorted to provide an overall consolidation recommendation (Step 210 of FIG. 2).

It is possible to extend the example given above to a more general case where there are a total of n number of print shops to be consolidated and k (<n) number of desired shops after consolidation. In order to appreciate how the system 110 determines all possible consolidation configurations in such a general case, it is useful to express the total number of possible configurations $P_k$ to consolidate n shops to k shops as follows:

$$P_k = C_n^k \cdot k^{n-k} \text{ where } C_n^k = \frac{n!}{(n-k)!k!} \quad (2)$$

The total number of possible configurations P to consolidate n shops regardless of how many consolidated shops will be produced can be expressed as follows:

$$P = \sum_{k=1}^{n-1} (C_n^k \cdot k^{n-k}) \quad (3)$$

Figure 13:
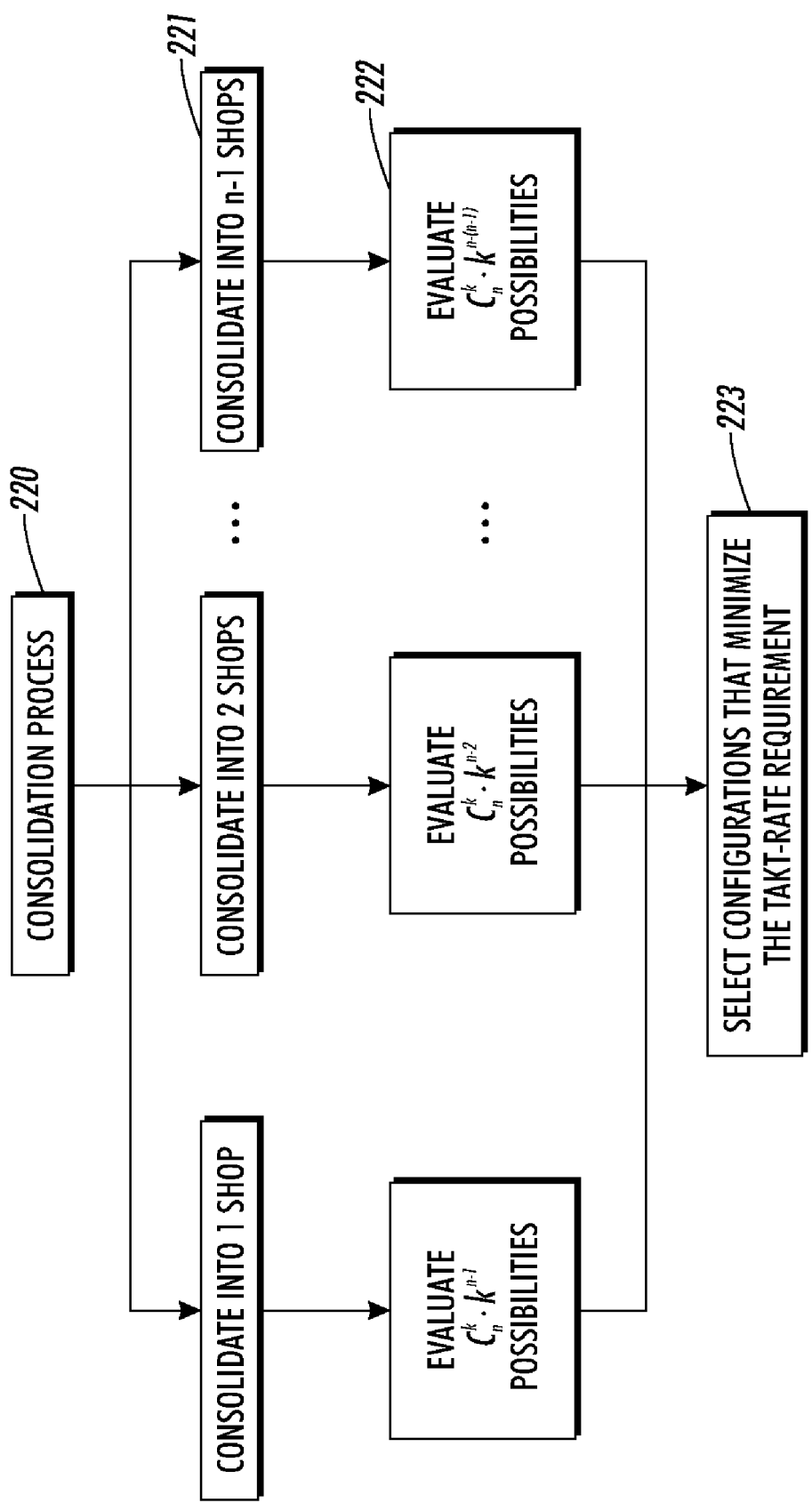
FIG. 13 illustrates a block diagram outlining general consolidation process modules of determining the required minimal takt-rates for each production function for all possible consolidation options irrespective of the number of consolidated shops.

FIG. 13 illustrates a block-diagram of operational modules of the consolidation process for the more general case. In order to determine the best consolidation options, it is necessary to search for configurations that have the minimal Takt rate through all P possible configurations.

It will be appreciated that variations of the above-disclosed and other features, aspects and functions, or alternatives thereof, may be desirably combined into many other different systems or applications.

Also, it will be appreciated that various presently unforeseen or unanticipated alternatives, modifications, variations or improvements therein may be subsequently made by those skilled in the art which are also intended to be encompassed by the following claims.

What is claimed is:

1. A print shop consolidation system for consolidated processing of a first print job unit and a second print job unit at one of a first print shop and a second print shop, wherein said first print job unit comprises a first logical unit of print jobs to be completed and wherein said second print job unit comprises a second logical unit of print jobs to be completed, wherein each one of the first and second print job units being associated collectively with a production function for determining units to be produced per unit time, wherein, without consolidation, the first print job unit would be printed at the first print shop, and wherein, without consolidation, the second print job unit would be printed at the second print shop, comprising:

(A) memory for storing a set of information relating to both a print job processing capability of the first print shop and a print job processing capability of the second print shop; and (B) a print shop consolidation management system, said print shop consolidation management system including an application for, (1) evaluating, with the set of information, an operational capacity of the first print shop to process both the first and second print job units, said evaluating of (B)(1) including determining a first takt-rate corresponding with performing the production function for determining units to be produced per unit time at the first print shop, (2) evaluating, with the set of information, an operational capacity of the second print shop to process both the first and second print job units, said evaluating of (B)(2) including determining a second takt rate corresponding with performing the production function for determining units to be produced per unit time at the second print shop, (3) determining a maximum takt-rate for a print job originating at said first print shop and processed at said second print shop, wherein said maximum takt-rate is computed via a takt-rate matrix comprising takt rates of said first print shop and said second print shop;

(4) providing a print shop consolidation recommendation based on a capacity requirement, wherein said capacity requirement is mapped to a plurality of cost numbers including at least one of costs of said first and said second print shops and costs of labor, thereafter aggregating said plurality of cost numbers into a single cost number to provide an overall consolidation recommendation; and (5) consolidating processing of the first and second print job units at one of said first and second print shops, with said evaluations of (B)(1) and (B)(2) for a minimum takt-rate so that either (a) processing of the first and second print job units occurs solely at the first print shop, if said first print shop has a lower said minimum takt-rate than said second print shop's said minimum takt-rate, or (b) processing of the first and second print job units occurs solely at the second print shop, if said second print shop has a lower said minimum takt-rate than said first print shop's said minimum takt-rate.

2. The print shop consolidation of claim 1, wherein the first takt-rate is compared with the second takt-rate to determine said minimum takt-rate and whether processing of the first and second print job units is to occur solely at the first print shop, or solely at the second print shop.

3. The print shop consolidation system of claim 2, in which a first time delay would be caused by delivering at least one print job of the second print job units from the second print shop to the first print shop, and in which a second time delay would be caused by delivering at least one print job of the first print job units from the first print shop to the second print shop, wherein the first takt-rate varies as a function of the first time delay, and the second takt-rate varies as a function of the second time delay.

4. The print shop consolidation system of claim 1, wherein the set of information comprising minimum operating capacity requirements is estimated by said print shop consolidation management system.

5. The print shop consolidation system of claim 1, wherein said print shop consolidation recommendation is generated with (B)(1) and (B)(2), and wherein performance of said (B)(3) is contingent on approval of said print shop consolidation recommendation.

6. The print shop consolidation system of claim 1, in which said print shop consolidation management system communicates with each one of the first and second print shops by way of a network, wherein the set of information includes print job unit processing related data and said print shop consolidation management system obtains the print job unit processing related data with the network.

7. A print shop consolidation system for consolidated processing of a first print job unit, a second print job unit and a third print job unit at one or two of a first print shop, a second print shop and a third print shop, wherein each one of the first, second, and third print job units is associated collectively with a production function for determining units to be produced per unit time, wherein said first print job unit comprises a first logical unit of print jobs to be completed, wherein said second print job unit comprises a second logical unit of print jobs to be completed, and wherein said third print job unit comprises a third logical unit of print jobs to be completed, comprising:

(A) a memory for storing a set of information relating to respective print job unit processing capabilities of the first print shop, the second print shop and the third print shop; and (B) a print shop consolidation management system, said print shop consolidation management system including an application for,
  (1) evaluating, with the set of information, an operational capacity of the first print shop to process first, second, and third print job units, wherein said evaluating of (B)(1) includes determining a first takt-rate corresponding with performing the production function for determining units to be produced per unit time at the first print shop,
  (2) evaluating, with the set of information, an operational capacity of the second print shop to process the first, second, and third print job units, wherein said evaluating of (B)(2) includes determining a second takt-rate corresponding with performing the production function for determining units to be produced per unit time at the second print shop,
  (3) evaluating, with the set of information, an operational capacity of the third print shop to process the first, second, and third print job units, wherein said evaluating of (B)(3) includes determining a third takt-rate corresponding with performing the production function for determining units to be produced per unit time at the third print shop,
  (4) determining a maximum takt-rate for a print job originating at said first print shop and processed at said second print shop, wherein said maximum takt-rate is computed via a takt-rate matrix comprising takt rates of said first print shop and said second print shop;
  (5) providing a print shop consolidation recommendation based on a capacity requirement, wherein said capacity requirement is mapped to a plurality of cost numbers including at least one of costs of said first and said second print shops and costs of labor, thereafter aggregating said plurality of cost numbers into a single cost number to provide an overall consolidation recommendation; and
  (6) consolidating processing of two of the first, second, and third print jobs at a first one of the first, second and third print shops with a minimum takt-rate, and processing a third one of the first, second, and third print job units at a second one of the first, second, and third print shops, with said evaluations of (B)(1), (B)(2), and (B)(3).

8. The print shop consolidation system of claim 7, wherein (B)(1)-(B)(4) are performed with said takt-rate matrix including entries corresponding with the first, second, and third takt-rates, wherein said takt-rate matrix denotes an estimated maximum takt-rate for each of said first, second, and third print shops in a consolidation configuration.

9. A method for consolidated processing of a first print job unit and a second print job unit at one of a first print shop and a second print shop, wherein said first print job unit comprises a first logical unit of print jobs to be completed and wherein said second print job unit comprises a second logical unit of print jobs to be completed, each one of the first and second print job units being associated collectively with a production function for determining units to be produced per unit time, wherein, without consolidation, the first print job unit would be printed at the first print shop, and wherein, without consolidation, the second print job unit would be printed at the second print shop, comprising:

(A) storing, in memory, a set of information relating to both a print job processing capability of the first print shop and a print job processing capability of the second print shop;

(B) evaluating, with the set of information, an operational capacity of the first print shop to process both the first and second print job unit, said (B) including determining a first takt-rate corresponding with performing the production function for determining units to be produced per unit time at the first print shop;

(C) evaluating, with the set of information, an operational capacity of the second print shop to process both the first and print job units, said (C) including determining a second takt-rate corresponding with performing the production function for determining units to be produced per unit time at the second print shop;

(D) determining a maximum takt-rate for a print job originating at said first print shop and processed at said second print shop, wherein said maximum takt-rate is computed via a takt-rate matrix comprising takt rates of said first print shop and said second print shop;

(E) providing a print shop consolidation recommendation based on a capacity requirement, wherein said capacity requirement is mapped to a plurality of cost numbers including at least one of costs of said first and said second print shops and costs of labor, thereafter aggregating said plurality of cost numbers into a single cost number to provide an overall consolidation recommendation; and (F) consolidating processing of the first and second print job units at one of said first and second print shops, with said evaluations of (B) and (C) for a minimum takt-rate so that either (1) processing of the first and second print job units occurs solely at the first print shop, if said first print shop has a lower said minimum takt-rate than said second print shop's said minimum takt-rate, or (2) processing of the first and second print job units occurs solely at the second print shop, if said second print shop has a lower said minimum takt-rate than said first print shop's said minimum takt-rate.

10. The method of claim 9, further comprising generating said print shop consolidation recommendation with said (B) and (C), and wherein said (D) is contingent on approval of said print shop consolidation recommendation.

11. A method for consolidated processing of a first print job unit, a second print job unit and a third print job unit at one or two of a first print shop, a second print shop and a third print shop, wherein said first print job unit comprises a first logical unit of print jobs to be completed, wherein said second print job unit comprises a second logical unit of print jobs to be completed, and wherein said third print job unit comprises a third logical unit of print jobs to be completed, wherein each one of the first, second, and third print job unit is associated collectively with a production function for determining units to be produced per unit time, comprising:

(A) storing a set of information relating to respective print job processing capabilities of the first print shop, the second print shop and the third print shop; and (B) evaluating, with the set of information, an operational capacity of the first print shop to process said first, second, and third print job units, wherein said (B) includes determining a first takt-rate corresponding with performing the production function for determining units to be produced per unit time at the first print shop;

(C) evaluating, with the set of information, an operational capacity of the second print shop to process the first, second, and third print job units wherein said (C) includes determining a second takt-rate corresponding with performing the production function for determining units to be produced per unit time at the second print shop;

(D) evaluating, with the set of information, an operational capacity of the third print shop to process the first, second, and third print job units, wherein said (D) includes determining a third takt-rate corresponding with performing the production function for determining units to be produced per unit time at the third print shop;

(E) determining a maximum takt-rate for a print job originating at said first print shop and processed at said second print shop, wherein said maximum takt-rate is computed via a takt-rate matrix comprising takt rates of said first print shop and said second print shop;

(F) providing a print shop consolidation recommendation based on a capacity requirement, wherein said capacity requirement is mapped to a plurality of cost numbers including at least one of costs of said first and said second print shops and costs of labor, thereafter aggregating said plurality of cost numbers into a single cost number to provide an overall consolidation recommendation; and (G) consolidating processing of two of the first, second, and third print job units at a first one of the first, second and third print shops with a minimum takt-rate, and processing a third of the first, second, and third print job units at a second one of the first, second, and third print shops, with said evaluations of (B), (C), and (D).

12. The method of claim 11, further comprising performing (B)-(E) with said takt-rate matrix including entries corresponding with the first, second, and third takt-rates, wherein said takt-rate matrix denotes an estimated maximum takt-rate for each of said first, second, and third print shops in a consolidation configuration.

13. A print shop consolidation system for consolidated processing of a first print job unit and a second print job unit at one of a first print shop and a second print shop, wherein said first print job unit comprises a first logical unit of print jobs to be completed and wherein said second print job unit comprises a second logical unit of print jobs to be completed, each one of the first and second groups of print jobs associated collectively with a production function for determining units to be produced per unit time, wherein, without consolidation, the first print job unit would be printed at the first print shop, and wherein, without consolidation, the second print job unit would be printed at the second print shop, comprising:

(A) memory for storing a set of information relating to both a cost of operating the first print shop and a cost of operating the second print shop; and (B) a print shop consolidation management system, said print shop consolidation management system including an application for, (1) evaluating, with the set of information, an operational capacity of the first print shop to process both the first and second print job units, said (B)(1) including evaluating the total cost of processing the first and second print job units at the first print shop, wherein said total cost of processing at said first print shop includes labor costs and facility costs associated with processing the first and second print job units at the first print shop, (2) evaluating, with the set of information, an operational capacity of the second print shop to process both the first and second print job units, said (B)(2) including evaluating the total cost of processing the first and second print job units at the second print shop, wherein said total cost of processing at said second print shop includes labor costs and facility costs associated with processing the first and second print job units at the second print shop, (3) determining a maximum takt-rate for a print job originating at said first print shop and processed at said second print shop, wherein said maximum takt-rate is computed via a takt-rate matrix comprising takt rates of said first print shop and said second print shop;

(4) providing a print shop consolidation recommendation based on a capacity requirement, wherein said capacity requirement is mapped to a plurality of cost numbers including at least one of costs of said first and said second print shops and costs of labor, thereafter aggregating said plurality of cost numbers into a single cost number to provide an overall consolidation recommendation; and (5) consolidating processing of the first and second print job units at one of first and second print shops, with said evaluations of (B)(1) and (B)(2) so that either (a) processing of the first and second print job units occurs solely at the first print shop, or (b) processing of the first and second print job units occurs solely at the second print shop.

14. The print shop consolidation system of claim 13, wherein the set of information comprising total cost of processing is estimated by said print shop consolidation management system.

15. The print shop consolidation system of claim 13, wherein said print shop consolidation recommendation is generated with (B)(1) and (B)(2), and wherein performance of said (B)(3) is contingent on approval of said print shop consolidation recommendation.

16. The print shop consolidation system of claim 13, in which said print shop consolidation management system communicates with each one of the first and second print shops by way of a network, wherein the set of information includes print job unit processing related data and said print shop consolidation management system obtains the print job unit processing related data with the network.

17. A method for consolidated processing of a first print job unit and a second print job unit at one of a first print shop and a second print shop, wherein said first print job unit comprises a first logical unit of print jobs to be completed and wherein said second print job unit comprises a second logical unit of print jobs to be completed, each one of the first and second groups of print jobs associated collectively with a production function for determining units to be produced per unit time, wherein, without consolidation, the first print job unit would be printed at the first print shop, and wherein, without consolidation, the second print job unit would be printed at the second print shop, comprising:

(A) storing, in memory, a set of information relating to both a cost of operating the first print shop and a cost of operating the second print shop;

(B) evaluating, with the set of information, an operational capacity of the first print shop to process both the first and second print job units, said (B) including evaluating the total cost of processing the first and second print job units at the first print shop, wherein said total cost of processing at said first print shop includes labor costs and facility costs associated with processing the first and second print job units at the first print shop;

(C) evaluating, with the set of information, an operational capacity of the second print shop to process both the first and second print job units, said (C) including evaluating the total cost of processing the first and second print job units at the second print shop, wherein said total cost of processing at said second print shop includes labor costs and facility costs associated with processing the first and second print job units at the second print shop;

(D) determining a maximum takt-rate for a print job originating at said first print shop and processed at said second print shop, wherein said maximum takt-rate is computed via a takt-rate matrix comprising takt rates of said first print shop and said second print shop;

(E) providing a print shop consolidation recommendation based on a capacity requirement, wherein said capacity requirement is mapped to a plurality of cost numbers including at least one of costs of said first and said second print shops and costs of labor, thereafter aggregating said plurality of cost numbers into a single cost number to provide an overall consolidation recommendation; and (F) consolidating processing of the first and second print job units at one of first and second print shops, with said evaluations of (B) and (C) so that either (1) processing of the first and second print job units occurs solely at the first print shop, or (2) processing of the first and second print job units occurs solely at the second print shop.

18. The method of claim 17, further comprising generating said print shop consolidation recommendation based on said total cost of processing at said first print shop and said second print shop, and wherein said consolidating processing is contingent on approval of said print shop consolidation recommendation.

* * * * *